United States Patent
Sun et al.

(10) Patent No.: US 12,530,580 B2
(45) Date of Patent: Jan. 20, 2026

(54) INFORMATION PROCESSING APPARATUS, INFORMATION PROCESSING METHOD AND PROGRAM

(71) Applicant: NTT, Inc., Tokyo (JP)

(72) Inventors: Jingyu Sun, Musashino (JP); Susumu Takeuchi, Musashino (JP); Hiroyuki Maeomichi, Musashino (JP); Ikuo Yamasaki, Musashino (JP)

(73) Assignee: NTT, Inc., Tokyo (JP)

( * ) Notice: Subject to any disclaimer, the term of this patent is extended or adjusted under 35 U.S.C. 154(b) by 534 days.

(21) Appl. No.: 18/021,256

(22) PCT Filed: Aug. 17, 2020

(86) PCT No.: PCT/JP2020/031001
§ 371 (c)(1),
(2) Date: Feb. 14, 2023

(87) PCT Pub. No.: WO2022/038660
PCT Pub. Date: Feb. 24, 2022

(65) Prior Publication Data
US 2023/0306259 A1 Sep. 28, 2023

(51) Int. Cl.
*G06N 3/08* (2023.01)
*G06N 3/0464* (2023.01)

(52) U.S. Cl.
CPC .......... *G06N 3/08* (2013.01); *G06N 3/0464* (2023.01)

(58) Field of Classification Search
CPC ...... G06N 3/08; G06N 3/0454; G06N 3/0464; G06N 20/00; G06F 40/20
See application file for complete search history.

(56) References Cited

U.S. PATENT DOCUMENTS

| | | | | |
|---|---|---|---|---|
| 10,997,472 | B2* | 5/2021 | Blundell | G06N 3/044 |
| 11,636,314 | B2* | 4/2023 | Song | G06N 3/047 |
| | | | | 706/15 |
| 2020/0193285 | A1* | 6/2020 | Ishii | G06N 3/084 |
| 2020/0257970 | A1* | 8/2020 | Moon | G06V 20/35 |
| 2021/0009166 | A1* | 1/2021 | Li | G06F 16/909 |
| 2022/0156587 | A1* | 5/2022 | Ebrahimpour | G06N 3/08 |

(Continued)

OTHER PUBLICATIONS

Fawaz et al., "InceptionTime: Finding AlexNet for Time Series Classification," arXiv:1909.04939v2 [cs.LG], Sep. 13, 2019, pp. 1-27.

*Primary Examiner* — Jorge A Casanova
(74) *Attorney, Agent, or Firm* — Fish & Richardson P.C.

(57) ABSTRACT

A learning network includes: a first extraction unit that extracts each feature vector of different pieces of teaching data designated in a support set using a first inception neural network that extracts a feature vector of time-series data by convolution layers with different filter sizes; a second extraction unit that extracts a feature vector of teaching data designated in a query set using a second inception neural network that extracts a feature vector of time-series data by a plurality of convolution layers with different filter sizes; and a learning unit that updates a network parameter of the learning network such that a relative distance between feature vectors of teaching data of the query set and of a positive sample of the support set is small and a relative distance between feature vectors of teaching data of the query set and of a negative sample of the support set is large.

6 Claims, 10 Drawing Sheets

(56) References Cited

U.S. PATENT DOCUMENTS

| | | | |
|---|---|---|---|
| 2022/0318621 A1* | 10/2022 | Gong | G06N 3/006 |
| 2023/0419170 A1* | 12/2023 | Chopde | G06N 20/00 |
| 2024/0185079 A1* | 6/2024 | Singh | G06N 3/08 |
| 2024/0193204 A1* | 6/2024 | Kuhn | G06N 3/096 |
| 2024/0265257 A1* | 8/2024 | Kida | G06N 20/00 |
| 2024/0338605 A1* | 10/2024 | Kida | G06N 20/00 |
| 2025/0200428 A1* | 6/2025 | Jang | G06N 20/00 |

* cited by examiner

INFORMATION PROCESSING APPARATUS, INFORMATION PROCESSING METHOD AND PROGRAM

CROSS-REFERENCE TO RELATED APPLICATIONS

This application is a National Stage application under 35 U.S.C. § 371 of International Application No. PCT/JP2020/031001, having an International Filing Date of Aug. 17, 2020, the disclosure of which is considered part of the disclosure of this application, and is incorporated by reference in its entirety into this application.

TECHNICAL FIELD

The present invention relates to an information processing apparatus, an information processing method, and an information processing program.

BACKGROUND ART

In the related art, it is known that various social problems can be solved by utilizing data in the real world collected from various devices such as the Internet of Things (IoT). In particular, time-series data including temporally changing data values is used in various scenes, and appropriate classification of time-series data regarding a certain event is an important problem when abnormality detection, trend analysis, and the like for the event are performed.

As traditional methods for classifying time-series data, various classification models (a statistical model and a regression model, for example) such as an auto regressive integrated moving average (ARIMA) model have been used. Such classification models perform classification on the basis of features of input time-series data. In order to successfully utilize the classification models, knowledge regarding the classification models and classification model parameters is needed. However, since it is necessary to manually select a classification model that satisfies requirements from among a plurality of types of classification models and set parameters of the classification model, great effort is required, and the accuracy of the classification may not be stable. Also, in a case in which many noise components are included in time-series data, it may not be possible to accurately recognize features of the time-series data and to successfully adapt to the classification model.

On the other hand, there is also a method of automatically learning various features of a plurality of pieces of time-series data in advance using machine learning and performing classification on the basis of which of features the features of input time-series data are similar to. However, in order to enable classification of time-series data using machine learning, a large amount of teaching data may be needed when the features of the time-series data are learned, and thus it may be practically difficult to realize the classification in many cases.

For example, the machine learning may include a convolutional neural network (CNN) and a recurrent neural network (RNN).

A CNN is used to classify images or videos and is a method of arranging, in series, a plurality of convolution layers for performing a convolution operation between an input layer and an output layer, applying filtering of each convolution layer to input images to generate a feature map in a stepwise manner, and classifying images on the basis of features in the finally obtained feature map. However, the filter sizes of the convolution layers are typically fixed and cannot be dynamically changed. Also, there is a high probability that classification results will significantly differ depending on design of the convolution layers.

The RNN is used to classify text and is a method including a recursive combination structure in which an output of a certain layer A is retroactively input to the next layer A to classify texts by focusing on the context. However, letters are recursively processed, and it is thus difficult to parallelize the entire processing. Also, in a case in which a sentence is too long, it may not be possible to accurately recognize features of the context of the consecutive letters or words, and thus the classification may not be appropriately performed. Further, there is a high probability that classification results will significantly differ depending on design of the layer A.

On the other hand, Non-Patent Literature 1 proposes a machine learning method incorporating an inception module. The inception module is a neural network that performs processing of branching a network, performing a convolution operation in each of convolution layers with different filter sizes in parallel, and finally combining a plurality of features extracted by the convolution operation.

In FIG. 1 of Non-Patent Literature 1, each of convolution layers with filter sizes with lengths of {10}, {20}, and {40} is applied in parallel to the time-series data on the left side, and a result of each convolution operation is finally combined. In this manner, according to Non-Patent Literature 1, since a plurality of features are extracted by applying each of convolution layers with different filter sizes in parallel to the time-series data, a high classification accuracy is achieved, as compared with a CNN in which the filter sizes of the convolution layers cannot dynamically be changed and an RNN in which it is difficult to parallelize the entire processing.

CITATION LIST

Non-Patent Literature

Non-Patent Literature 1: Hassan Ismail Fawaz, and 9 others "InceptionTime: Finding AlexNet for Time Series Classification", arXiv:1909.04939v2 [cs.LG] 13 Sep. 2019, p. 1-p. 27

SUMMARY OF INVENTION

Technical Problem

According to Non-Patent Literature 1, a plurality of features are extracted by applying each of convolution layers with different filter sizes for one piece of time-series data in parallel, and it is thus possible to accurately classify the time-series data by utilizing the plurality of features. However, the machine learning method in Non-Patent Literature 1 also requires a large amount of teaching data. Also, according to Non-Patent Literature 1, the plurality of features that are obtained by applying each convolution layer in parallel are combined as they are, and it is thus not possible to efficiently classify the time-series data.

The present invention has been made in view of the above circumstances, and an object of the present invention is to provide a technique that enables accurate classification of time-series data with a small amount of teaching data.

Solution to Problem

An information processing apparatus according to an aspect of the present invention is an information processing apparatus that learns or classifies time-series data in a learning network, the learning network including a first extraction unit that extracts each feature vector of a plurality of different pieces of teaching data designated in a support set using a first inception neural network that extracts a feature vector of time-series data using a plurality of convolution layers, each of which performs a convolution operation with different filter sizes, a second extraction unit that extracts a feature vector of teaching data designated in a query set using a second inception neural network that extracts a feature vector of time-series data using a plurality of convolution layers, each of which performs a convolution operation with different filter sizes, and a learning unit that updates a network parameter of the learning network such that a relative distance between feature vectors of teaching data of the query set and of a positive sample which coincides with or is similar to teaching data of the query set which is teaching data of the support set is small and a relative distance between feature vectors of the teaching data of the query set and of a negative sample that does not coincide with or is not similar to the teaching data of the query set which is the teaching data of the support set is large, using each of feature vectors of the plurality of pieces of teaching data and the feature vector of the teaching data.

An information processing method according to an aspect of the present invention is an information processing method that learns or classifies time-series data in a learning network, the learning network including the steps of extracting each feature vector of a plurality of different pieces of teaching data designated in a support set using a first inception neural network that extracts a feature vector of time-series data using a plurality of convolution layers, each of which performs a convolution operation with different filter sizes, extracting a feature vector of teaching data designated in a query set using a second inception neural network that extracts a feature vector of time-series data using a plurality of convolution layers, each of which performs a convolution operation with different filter sizes, and updating a network parameter of the learning network such that a relative distance between feature vectors of teaching data of the query set and of a positive sample which coincides with or is similar to teaching data of the query set which is teaching data of the support set is small and a relative distance between feature vectors of the teaching data of the query set and of a negative sample that does not coincide with or is not similar to the teaching data of the query set which is the teaching data of the support set is large, using each of feature vectors of the plurality of pieces of teaching data and the feature vector of the teaching data.

An information processing program according to an aspect of the present invention causes a computer to function as the aforementioned information processing apparatus.

Advantageous Effects of Invention

According to the present invention, it is possible to provide a technique that enables accurate classification of time-series data with a small amount of teaching data.

DESCRIPTION OF EMBODIMENT

Hereinafter, an embodiment of the present invention will be described with reference to the drawings. The same reference signs will be applied to the same components in the description of the drawings, and a description thereof will be omitted.

SUMMARY OF INVENTION

[First Feature]
Even the machine learning method in Non-Patent Literature 1 requires a large amount of teaching data.

Thus, the present invention realizes an architecture that enables learning and inference with only a small number of pieces of teaching data by arranging a plurality of inception neural networks extracting feature values of time-series data by convolution layers with different filter sizes and applying this to each of a support set and a query set of a prototypical classification framework.

Specifically, at least two inception neural networks (hereinafter, referred to as first and second inception neural networks) having the same configurations as that of the inception neural network in Non-Patent Literature 1 in principle are prepared. Also, a support set in which a plurality of pieces of teaching data are designated is prepared. Moreover, a query set in which one piece of teaching data is designated is prepared. Then, the first inception neural network is applied to the plurality of teaching data designated in the support set, and each of feature vectors of the plurality of pieces of teaching data is extracted. Similarly, the second inception neural network is applied to the one piece of teaching data designated in the query set, and the feature vector of the one piece of teaching data is extracted. Thereafter, a network parameter of the learning network is updated such that a relative distance between feature vectors of the teaching data of the query set and of a positive sample in the teaching data of the support set is small and a relative distance between feature vectors of the teaching data of the query set and of a negative sample in the teaching data of the support set is large. It is thus possible to accurately classify the time-series data with a small amount of teaching data.

[Second Feature]
According to the machine learning method of Non-Patent Literature 1, it is not possible to efficiently classify the time-series data.

Thus, according to the present invention, convolution layers with different filter sizes are processed in parallel, each feature value of the teaching data extracted by each convolution layer of the first inception neural network corresponding to the support set is compared with each feature value of the teaching data extracted by each convolution layer of the second inception neural network corresponding to the query set, each score based on the comparison result is calculated, and each score is applied to each convolution layer of the first inception neural network, thereby applying a weight to convolution layers effective for the classification task and thus realizing an efficient learning process.

Specifically, each attention score based on a similarity, a relevance, and a correlation between a feature vector of one piece of teaching data extracted by each of parallel convolution layers in the first inception neural network and one feature vector extracted by each of parallel convolution layers in the second inception neural network is calculated, and each attention score is applied as a weight. In this manner, it is possible to efficiently classify the time-series data.

[Configuration of Information Processing Apparatus]

Figure 1:
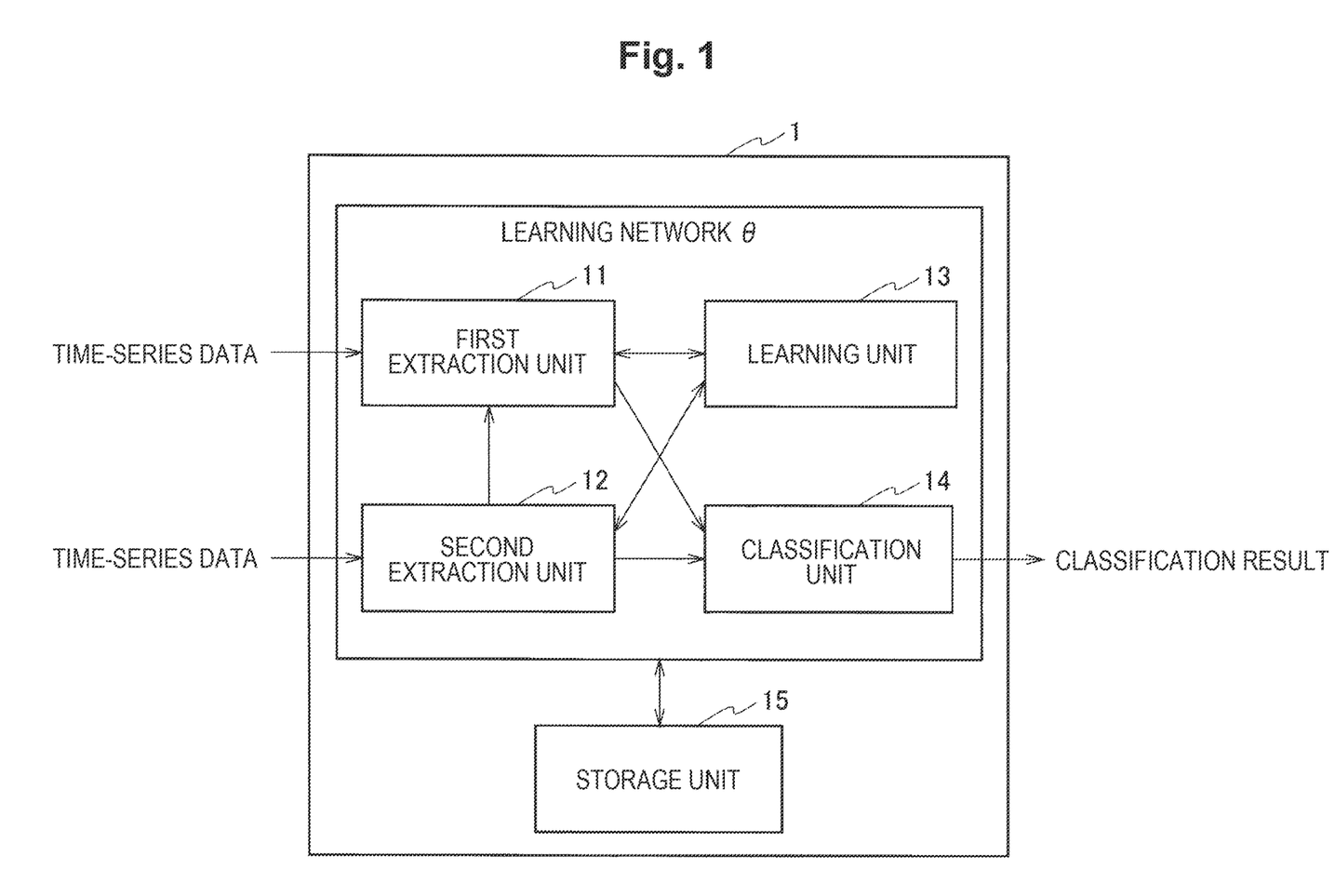
FIG. 1 is a diagram illustrating a configuration of an information processing apparatus according to the present embodiment.

FIG. 1 is a diagram illustrating a configuration of an information processing apparatus according to the present embodiment.

An information processing apparatus 1 is a time-series data learning apparatus that learns time-series data in a learning network θ and is also a time-series data classification apparatus that classifies the time-series data in the learning network θ. The time-series data is data having a data value that changes with time. For example, the time-series data is data in which a voltage value of a change in voltage identified as being normal is recorded or data in which a voltage value of a change in voltage identified as being abnormal is recorded.

The learning network θ includes a first extraction unit 11, a second extraction unit 12, a learning unit 13, and a classification unit 14. The first extraction unit 11, the second extraction unit 12, and the learning unit 13 constitute the time-series data learning apparatus. The first extraction unit 11, the second extraction unit 12, and the classification unit 14 constitute the time-series data classification apparatus. The information processing apparatus 1 includes a storage unit 15 that stores the learning network θ.

[Input/Output Data]

Figure 2:
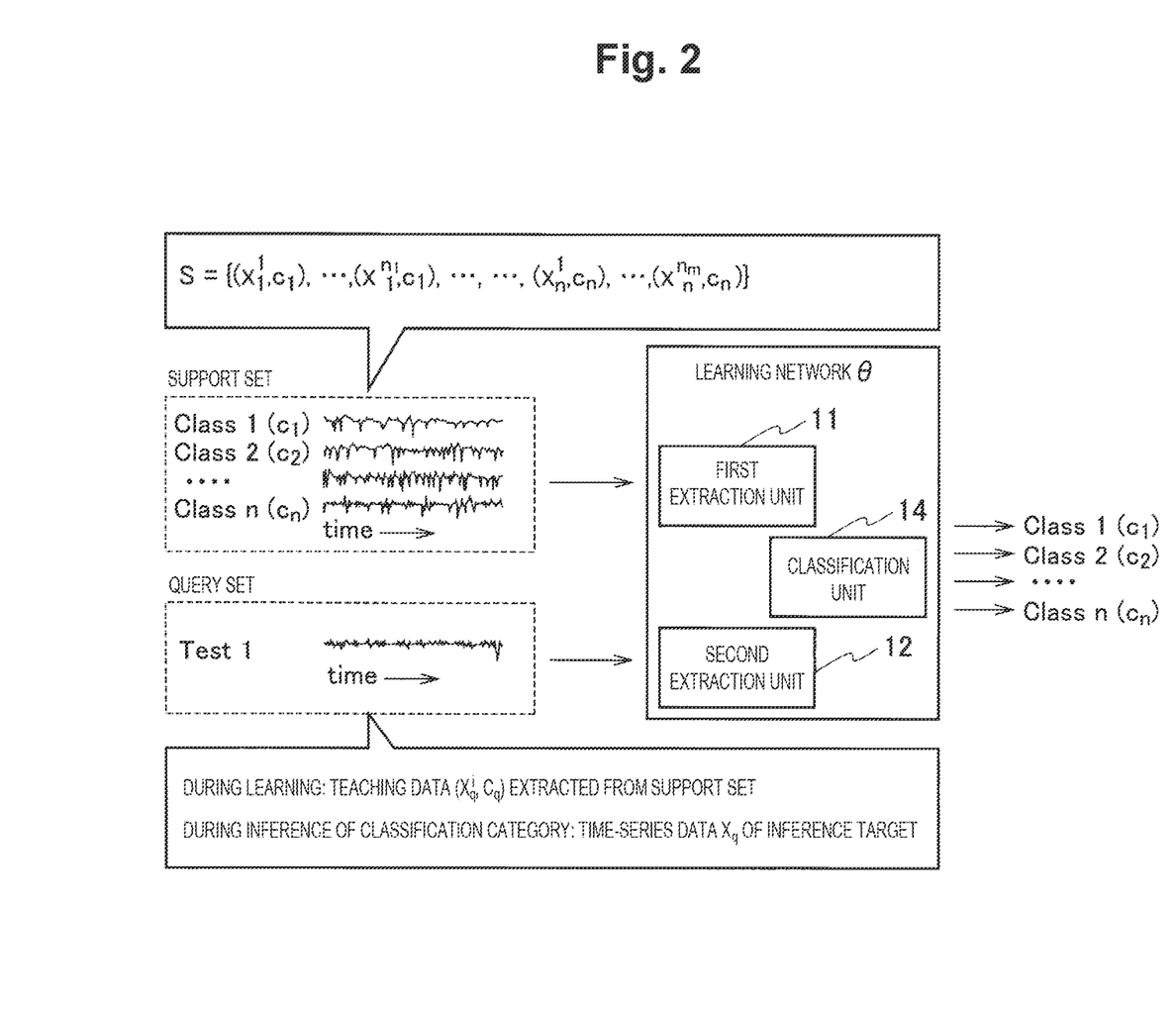
FIG. 2 is a diagram illustrating time-series data input to a learning network and a classification result output from the learning network.

FIG. 2 is a diagram illustrating time-series data input to the learning network and a classification result output from the learning network.

As teaching data to be input to the learning network θ, a support set and a query set are prepared. The teaching data is learning data as a correct answer or learning data with a correct answer flag applied thereto.

A user manually designates teaching data $X_n^{nm}$ of each class $C_n$ in the support set. As the number of pieces of teaching data in each class, 5 to 100 samples are enough. In a case of an abnormality detection class $C_1$, for example, teaching data of 100 abnormality patterns is designated. In a case of a data classification class $C_2$, teaching data of 50 classification patterns is designated. The plurality of pieces of teaching data $S=\{(X_1^1, C_1), \ldots, (X_n^{nm}, C_n)\}$ designated in the support set are input to the first extraction unit 11 constituting the learning network θ.

As designated patterns of the plurality of pieces of teaching data designated in the support set, a first designation pattern of designating a plurality of pieces of teaching data only for one class, a second designation pattern of designating only one piece of teaching data for each of a plurality of classes, and a third designation pattern of designating a plurality of pieces of teaching data for each of a plurality of classes are conceivable, for example. FIG. 2 illustrates the second designation pattern.

In the query set, teaching data $X_q^i$ in a predetermined class $C_q$ extracted from a plurality of pieces of teaching data S designated in the support set is designated during learning. Every time learning is repeated, one different piece of teaching data $X_q^{i+1}$ is designated from the support set in order, and learning is performed for the individual pieces of teaching data $X_q^i$. On the other hand, the time-series data $X_q$ as a classification target that is an inference target is designated at the time of inference of a classification category. Teaching data $(X_q i, C_q)$ during learning designated in the query set or the time-series data $X_q$ during inference of the classification category is input to the second extraction unit 12 constituting the learning network θ.

During inference of the classification category, the classification unit 14 constituting the learning network θ outputs a classification result of performing estimation calculation for which piece of the plurality of teaching data designated in the support set the time-series data $X_q$ as a classification target designated in the query set belongs to. In a case of the first designation pattern, for example, similarity of the time-series data $X_q$ with respect to the teaching data $X_n^{nm}$ is output. In a case of the second designation pattern, similarity of the time-series data $X_q$ with respect to each class $C_n$ is output. Examples of a method of outputting similarity includes numbers (%), letters, and a graph.

[Configuration of Learning Network]

Figure 3:
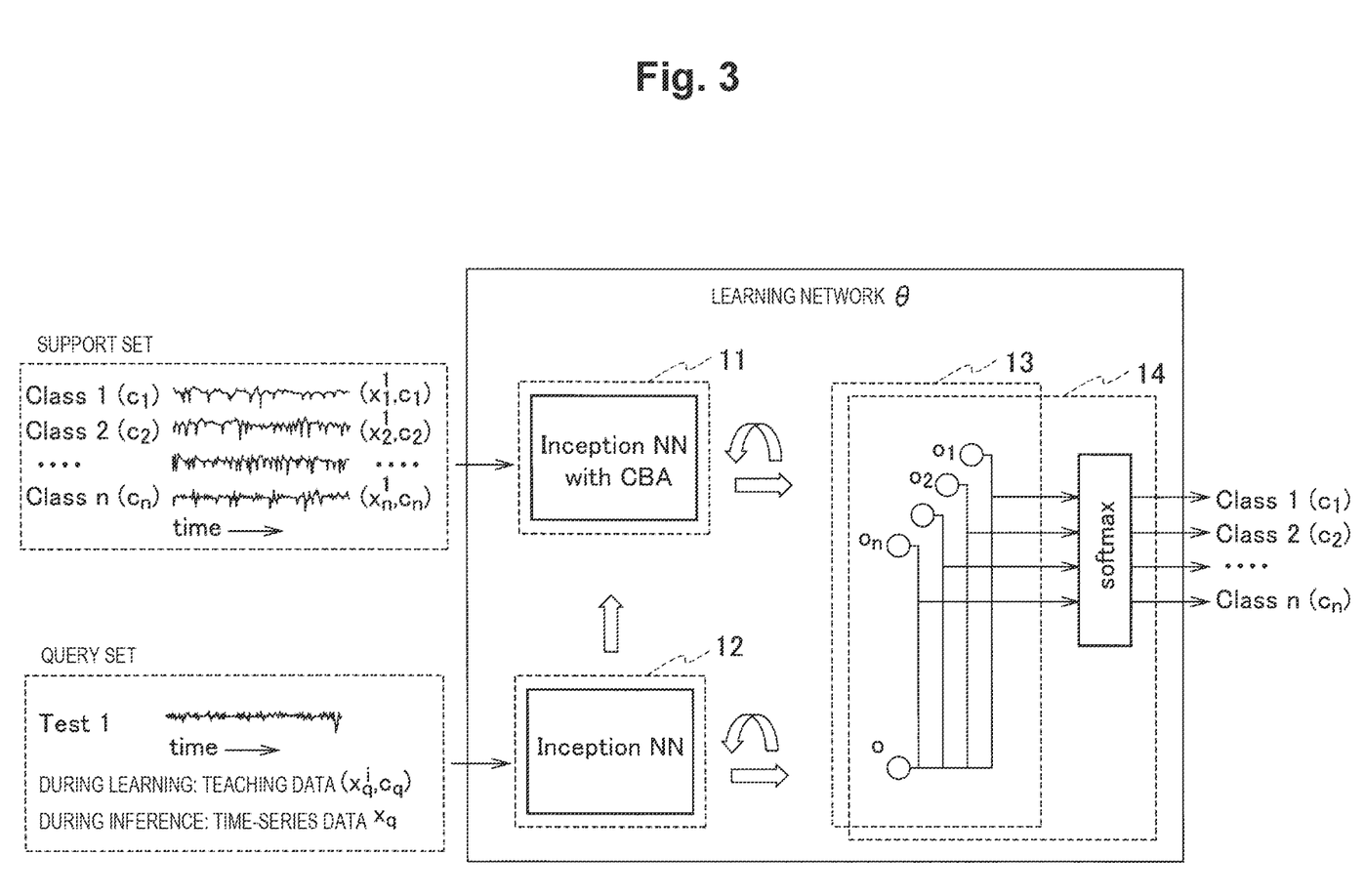
FIG. 3 is a diagram illustrating a configuration of the learning network.

FIG. 3 is a diagram illustrating a configuration of the learning network.

The first extraction unit 11 includes a first inception neural network. The first extraction unit 11 has a function of extracting each of feature vectors of a plurality of different pieces of teaching data designated in the support set using the first inception neural network. For example, the first extraction unit 11 extracts a feature vector $O_1$ of the teaching data $X_1^1$ in the class $C_1$ designated in the support set and extracts a feature vector $O_2$ of the teaching data $X_2^1$ in the class $C_2$ using the first inception neural network.

The second extraction unit 12 includes a second inception neural network that includes the same configuration as that of the first inception neural network in principle. The second extraction unit 12 has a function of extracting a feature vector O of the teaching data $(X_q^i, C_q)$ during learning designated in the query set or of the time-series data $X_q$ during inference of the classification category using the second inception neural network.

Both the first and second inception neural networks include convolution layers on the input side and combining layers on the output side. The first inception neural network further includes a score application unit (cross branch attention: CBA) that applies an attention score for attention. The second inception neural network does not include the score application unit.

The score application unit calculates an attention (cross attention) score representing a relationship regarding similarity between feature vectors of each of parallel convolution layers (branch) constituting a first convolution layer in the first inception neural network and of each of parallel convolution layers (branch) constituting a second convolution layer in the second inception neural network and adjusts a weight at the time of combining the feature vectors of the plurality of pieces of time-series data designated in the support set. In FIG. 3 and the following drawings, the first inception neural network is illustrated as an "Inception NN with CBA", and the second inception neural network is illustrated as an "Inception NN".

Details of the first and second inception neural networks will be described later.

The learning unit 13 has a function of performing learning processing of adjusting a network parameter of the learning network θ using each of feature vectors $O_n$ of a plurality of pieces of teaching data extracted by the first extraction unit 11 and a feature vector O of the teaching data extracted by the second extraction unit 12. The network parameter is, for example, a weight variable of each convolution layer constituting the first and second inception neural networks or a bias variable.

The classification unit 14 has a function of calculating each similarity between each of feature vectors On of the plurality of pieces of teaching data designated in the support set and the feature vector O of the time-series data as a classification target that is an inference target designated in the query set and calculating a classification label vector regarding the time-series data that is the classification target. For the calculation of the classification label vector, a softmax function, for example, is used.

Specifically, the classification unit 14 calculates and estimates the classification category of the time-series data as a classification target designated in the query set for the plurality of pieces of teaching data designated in the support set, using the learned learning network θ in which the network parameter has been updated. The probability that the time-series data, which is the classification target, is teaching data A is calculated as 72i, and the probability that the time-series data, which is the classification target, is teaching data B is calculated as 28%, for example.

[Configurations of First and Second Inception Neural Networks]

Figure 4:
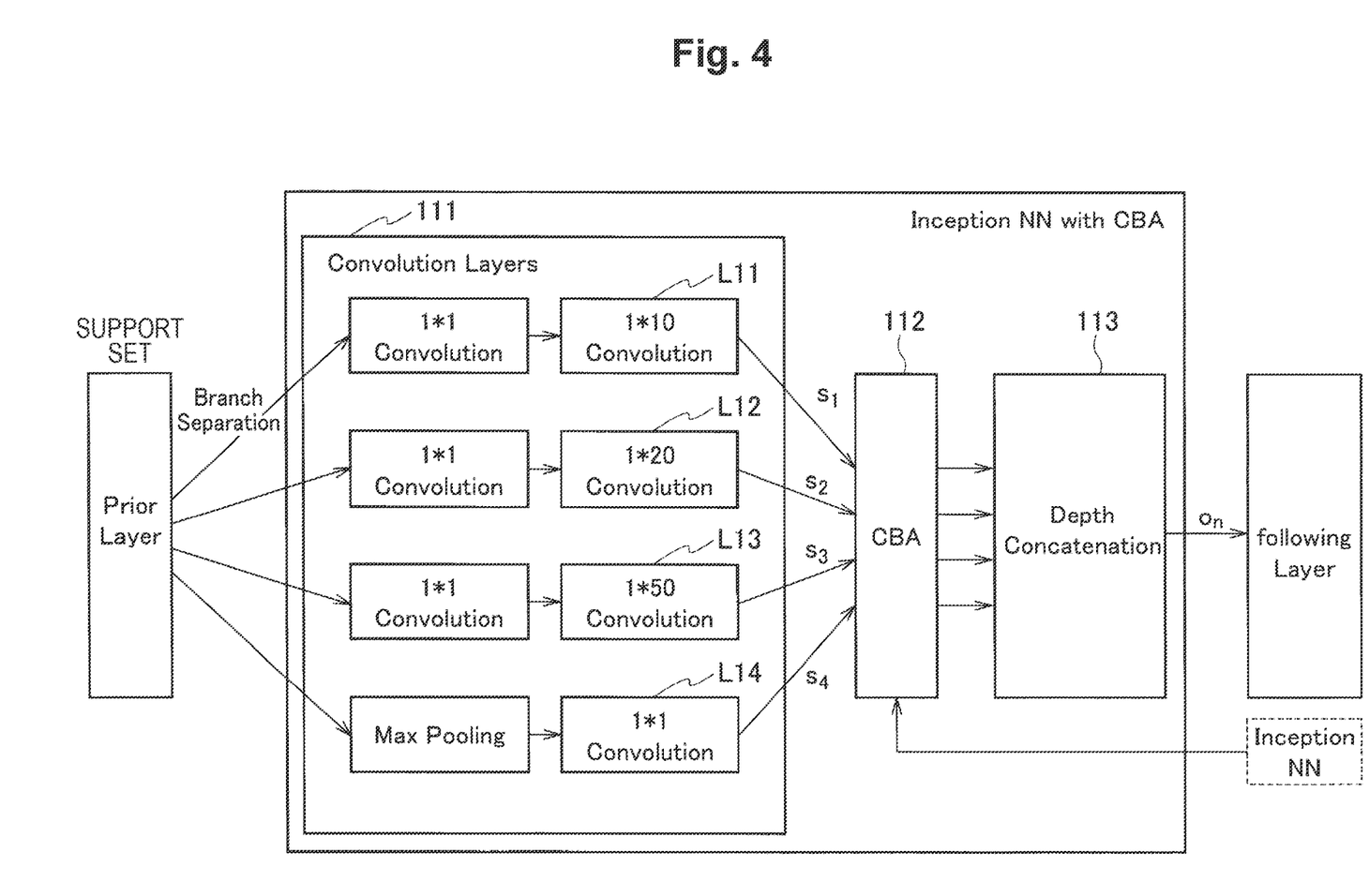
FIG. 4 is a diagram illustrating a configuration of a first inception neural network.

FIG. 4 is a diagram illustrating a configuration of the first inception neural network.

The first inception neural network is a neural network that extracts a feature vector of teaching data designated in the support set by using a plurality of convolution layers that perform convolution operations with different filter sizes in parallel. For example, the first inception neural network includes a first convolution layer (convolution layers) 111, a score application unit (CBA) 112, and a first combining layer (depth concatenation) 113.

In the first convolution layer 111, a first convolution layer L11 that performs a convolution operation with a {1×10} filter, a second convolution layer L12 that performs a convolution operation with a {1×20} filter, a third convolution layer L13 that performs a convolution operation with a {1–50} filter, and a fourth convolution layer L14 that performs a convolution operation with a {1×1} filter are executed in parallel, for example.

The first convolution layer L11 further performs a convolution operation of the feature vector of the teaching data extracted by the {1×1} convolution layer in the previous stage with the {1×10} filter for the teaching data designated in the support set and outputs the feature vector $S_1$ extracted through the convolution operation to the first combining layer 113 via the score application unit 112.

The second convolution layer L12 further performs a convolution operation on the feature vector of the teaching data extracted by the {1×1} convolution layer in the previous stage with the {1×20} filter for the teaching data designated in the support set and outputs the feature vector $S_2$ extracted through the convolution operation to the first combining layer 113 via the score application unit 112.

The third convolution layer L13 further performs a convolution operation on the feature vector of the teaching data extracted by the {1×1} convolution layer in the previous stage with the {1×50} filter for the teaching data designated in the support set and outputs the feature vector $S_3$ extracted through the convolution operation to the first combining layer 113 via the score application unit 112.

The fourth convolution layer L14 performs a convolution operation on the teaching vector of the teaching data extracted by the MAX Pooling layer in the previous stage with the {1×1} filter for the teaching data designated in the support set and outputs the feature vector $S_4$ extracted through the convolution operation to the first combining layer 113 via the score application unit 112.

The first combining layer 113 combines all the feature vectors $S_1$ to $S_4$ output from each of the first to fourth convolution layers L11 to L14 via the score application unit 112 and outputs one feature vector On. The one feature vector $O_n$ is a feature vector of one piece of teaching data of the plurality of pieces of teaching data designated in the support set.

Figure 5:
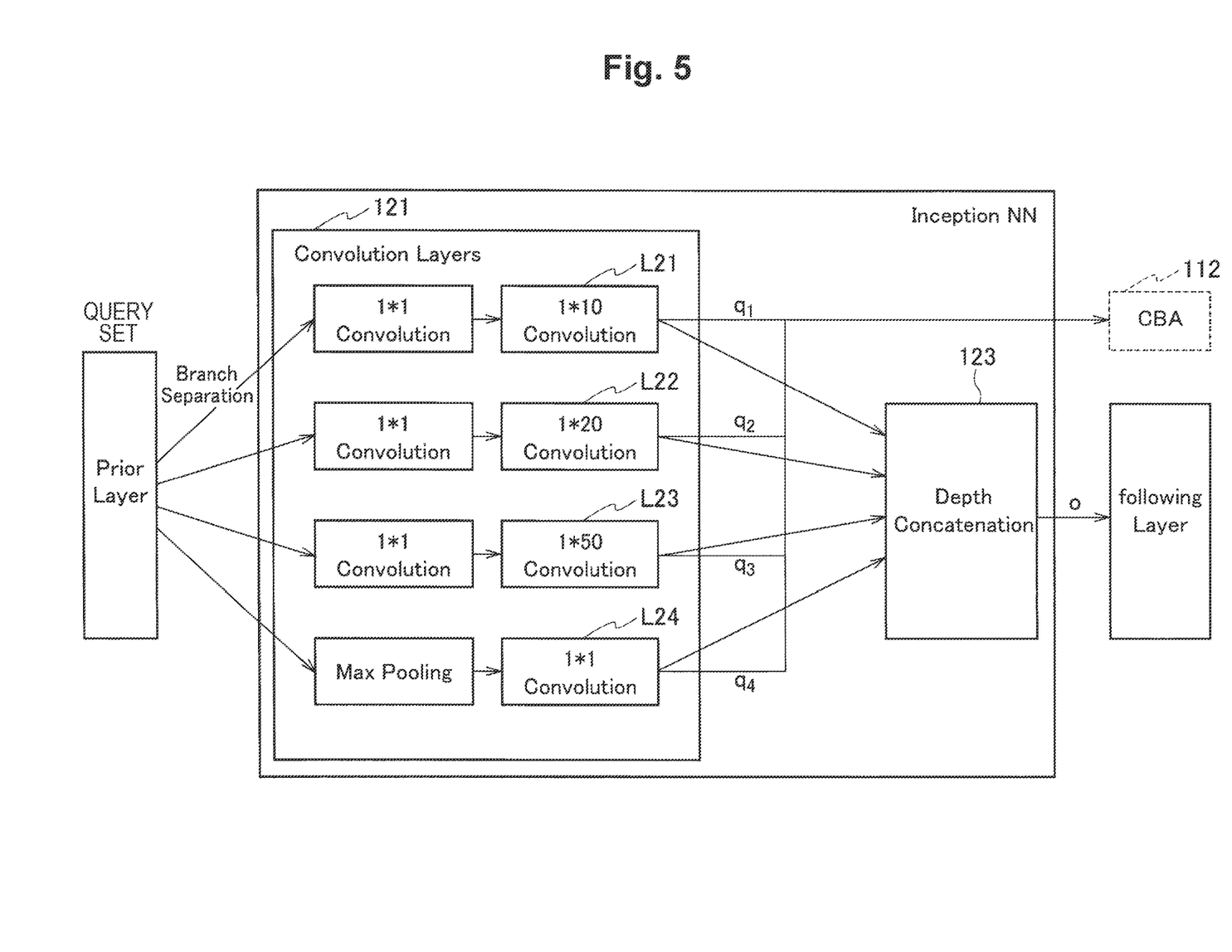
FIG. 5 is a diagram illustrating a configuration of a second inception neural network.

FIG. 5 is a diagram illustrating a configuration of the second inception neural network.

The second inception neural network is a neural network that extracts a feature vector of teaching data during learning designated in the query set or of a time-series data during inference of a classification category using a plurality of convolution layers that perform convolution operations with different filter sizes in a parallel manner. For example, the second inception neural network includes a second convolution layer 121 and a second combining layer 123.

The second convolution layer 121 has the same configuration as that of the first convolution layer 111 of the first inception neural network, and the first to fourth convolution layers L21 to L24 are executed in parallel. The first to fourth convolution layers L21 to L24 extract feature vectors $Q_1$ to $Q_4$ by using convolution operations for teaching data during learning designated in the query set or time-series data during inference of a classification category, output the feature vectors $Q_1$ to $Q_4$ to the second combining layer 123, and also output the feature vectors $Q_1$ to $Q_4$ to the score application unit 112 of the first inception neural network.

The second combining layer 123 combines all the feature vectors $Q_1$ to $Q_4$ output from the first to fourth convolution layers L1 to L4 respectively and outputs one feature vector O.

Here, the score application unit 112 of the first inception neural network will be described (see FIG. 4). The score application unit 112 inputs the feature vectors $S_1$ to $S_4$ (=$S_1$) for one piece of teaching data designated in the support set by the first convolution layer 111 in the previous stage and inputs the feature vectors $Q_1$ to $Q_4$ (=$Q_1$) for one piece of teaching data designated in the query set by the second convolution layer 121 of the second inception neural network or the time-series data. The score application unit 112 calculates each attention score in consideration of a similarity relationship of the time-series data between the support set and the query set using each input feature vector $S_i$ and each feature vector $Q_1$ and applies each of the feature vectors $S_1$ to $S_4$ extracted in each of the convolution layers L11 to L14 or each attention score calculated for each of the convolution layers L11 to L14 as a weight.

Figure 6:
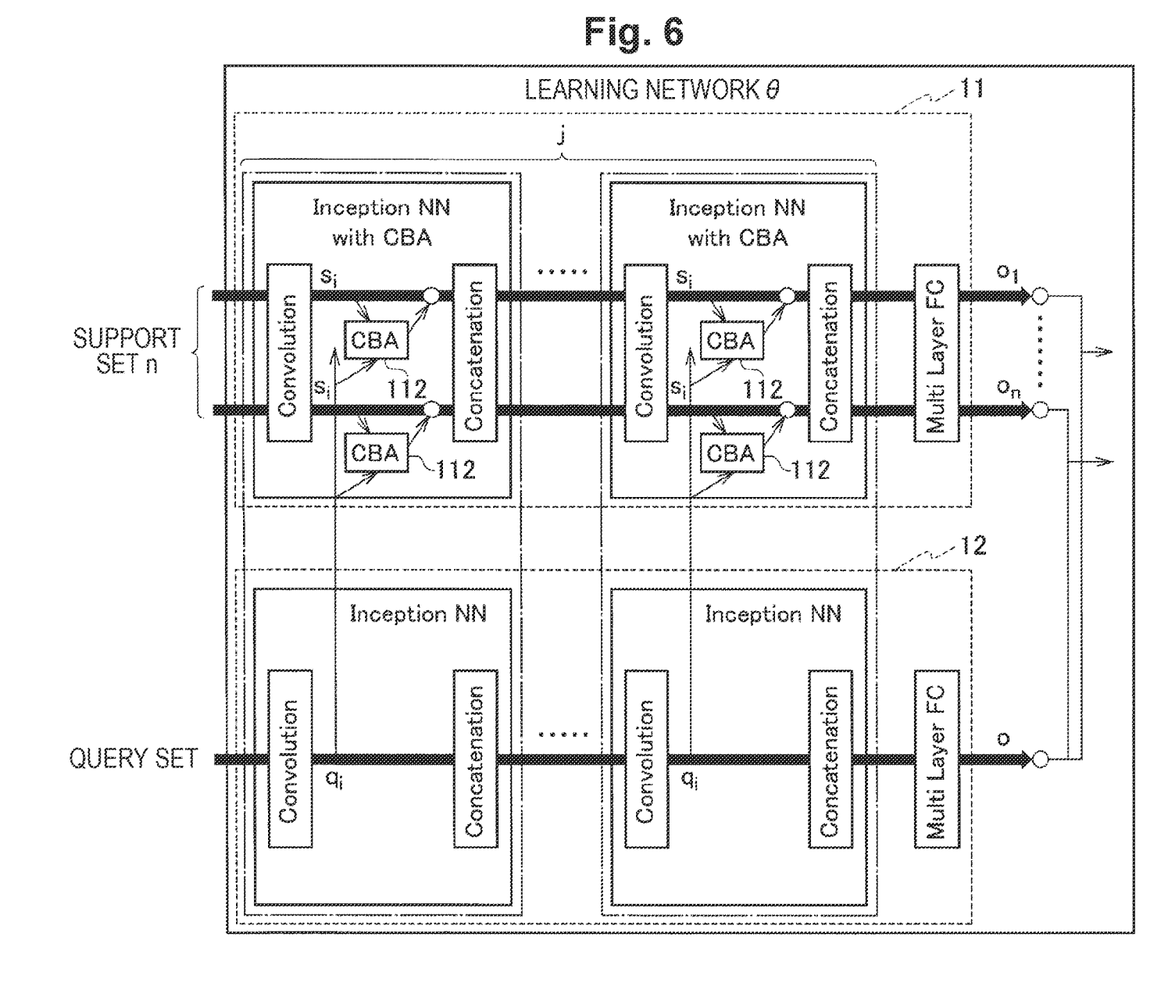
FIG. 6 is a diagram illustrating an arrangement example of the first and second inception neural networks.

FIG. 6 is a diagram illustrating an arrangement example of the first and second inception neural networks.

j (j≥1) pairs of first and second inception neural networks are arranged in series. In addition, n (n≥2) pieces of teaching data are designated in the support set, and the score application unit 112 of the first inception neural network inputs each of i feature vectors $S_i$ extracted for each of the n pieces of teaching data and calculates each attention score using the i feature vectors $Q_i$ of the teaching data or the time-series data output from the second inception neural network.

[Operations of Score Application Unit]

Figure 7:
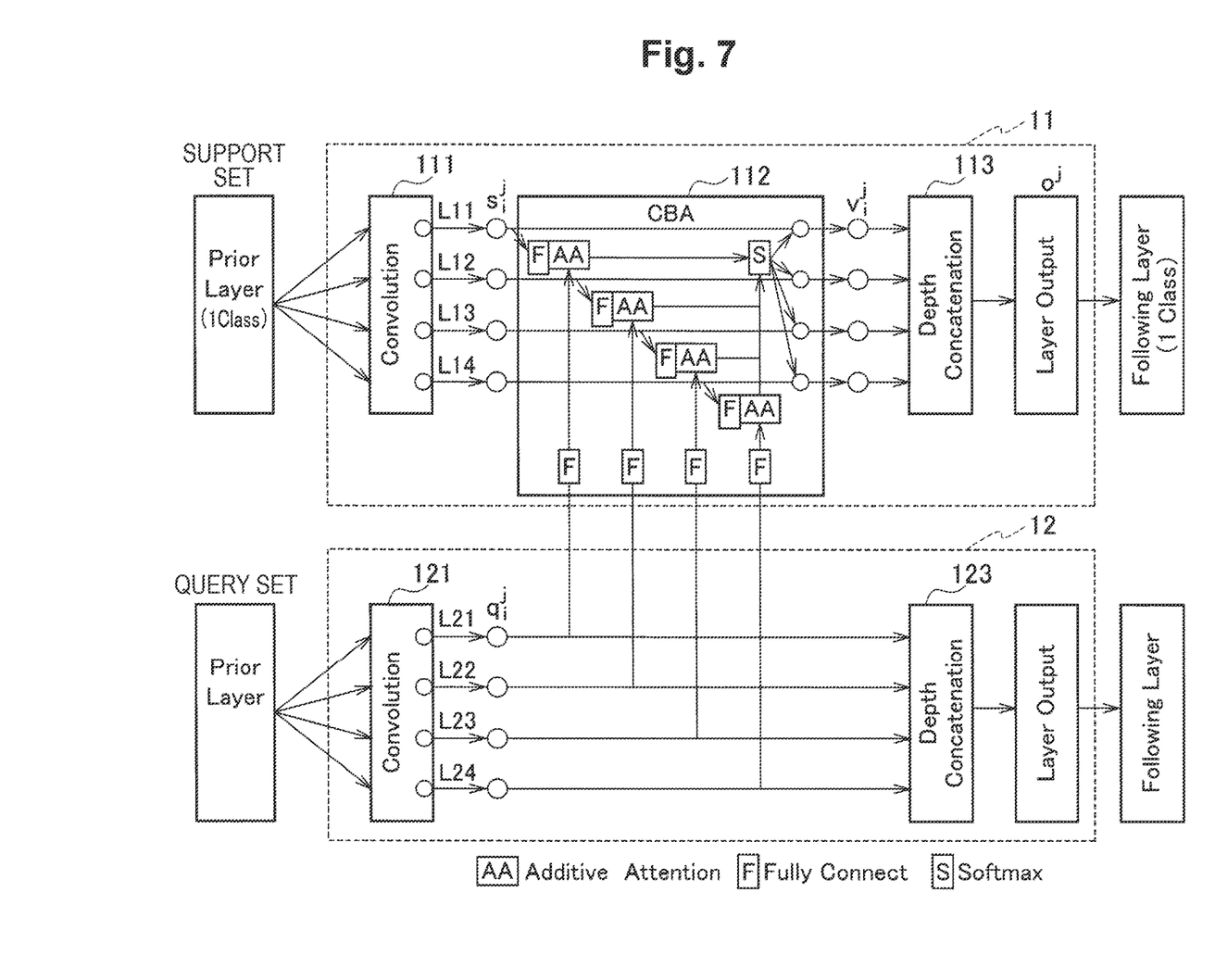
FIG. 7 is a diagram illustrating an operation image of a score application unit.

FIG. 7 is a diagram illustrating an operation image of the score application unit.

The score application unit 112 performs processing of applying cross branch attention by which it is possible to efficiently weight a convolution layer (branch) that is effective for classification as described above. The details will be described below.

First, the score application unit 112 substitutes each feature vector $S_i^j$ extracted in each of the convolution layers L11 to L14 of the first convolution layer 111 and each feature vector $Q_i^j$ extracted in each of the convolution layers L21 to L24 of the second convolution layer 121 into, for example, a score function model-defined as in Expression (1) and calculates an attention score $Score_i^j$ of each pair of feature vectors $(S_i^j, Q_i^j)$ corresponding to each convolution layer. $v_a^T$ and $W_a$ are parameters of the model. $W_a$ is a matrix function of $S_i^j$ and $Q_i^j$.

[Math. 1]

$$Score_i^j = v_a^T \tan h(W_a[s_i^j; q_i^j]) \quad (1)$$

Expression (1) is an example of the score function that calculates a score for attention. The score application unit 112 can use an arbitrary function capable of calculating a score based on similarity between the feature vectors instead of the score function of Expression (1).

Next, the score application unit 112 substitutes each attention score $Score_i^j$ into Expression (2) and calculates a ratio $a_i^j$ of each attention score to the total score of the attention scores.

[Math. 2]

$$a_i^j = \frac{\exp(Score_i^j)}{\sum_i \exp(Score_i^j)} \quad (2)$$

Next, the score application unit 112 weights the ratio $a_i^j$ of each attention score with respect to each feature vector $S_i^j$ extracted in each of the convolution layers L11 to L14 of the first convolution layer 111 using Expression (3).

[Math. 3]

$$v_i^j = a_i^j s_i^j \quad (3)$$

Finally, the first combining layer 113 combines each feature vector $S_i^j$ to which each rate $a_i^j$ of the attention scores is weighted using Expression (4).

[Math. 4]

$$o^j = DepthConcat(v_i^j) \quad (4)$$

In Expression (4), $a_1^j \times S_1^j + a_2^j \times S_2^j + a_3^j \times S_3^j \ldots$ is calculated. In other words, each feature vector $S_i^j$ is multiplied by the score based on the similarity between the corresponding feature vectors $(S_i^j, Q_i^j)$ as a weight, and the one combined feature vector thereof is used as the feature vector $O^j$ of the one piece of teaching data designated in the support set.

[Operations of Learning Unit]

The learning unit 13 calculates an N-pair loss (N-pair-ms Loss) for each feature vector $O_n$ of the plurality of pieces of teaching data designated in the support set and the feature vector O of the teaching data during learning designated in the query set by using a loss function model-defined as in Expression (5), for example, and repeatedly updates the network parameter of the learning network θ so as to reduce the calculated loss.

Figure 8:
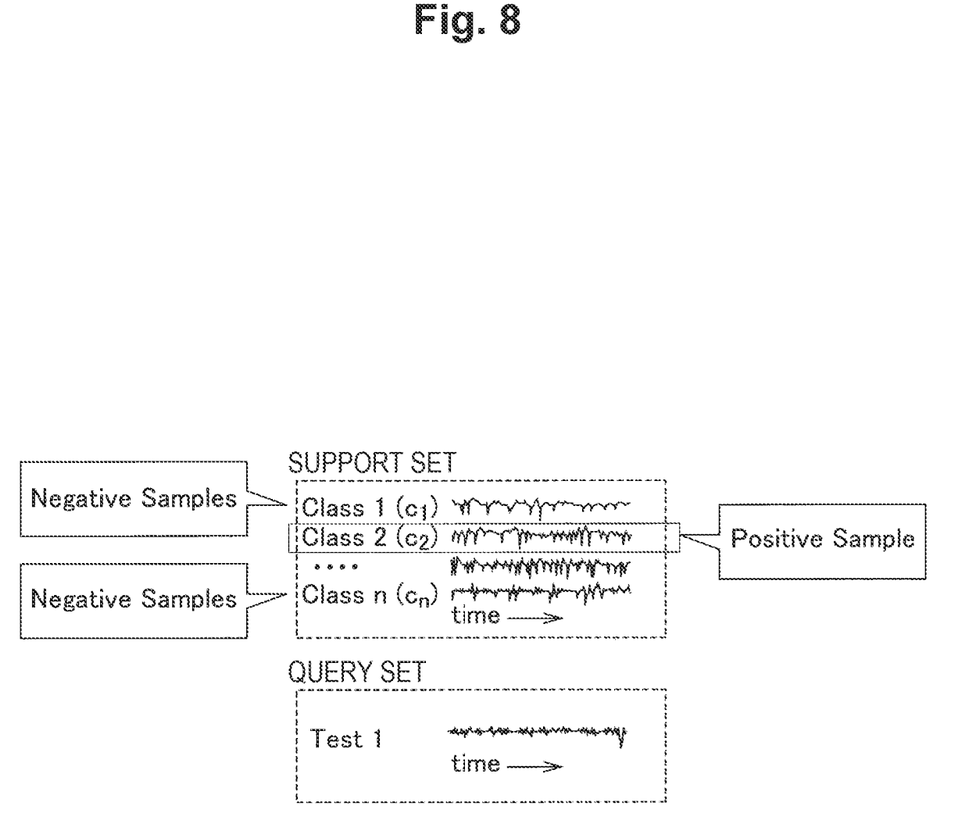
FIG. 8 is a diagram illustrating an example of a positive sample and a negative sample.

[Math. 5]

$$L_{Npairms} = L(x, x^+, \{x_i\}_{i=1}^{n-1}, f) = \log\left(1 + \sum_{i=1}^{n-1} \exp(f^T f_i - f^T f^+)\right) \quad (5)$$

x is each feature vector of the plurality of pieces of teaching data designated in the support set. $x^+$ is a feature vector of a positive sample (see FIG. 8) in the support set. $\{x_i\}_{i=1}^{n-1}$ is a feature vector of a negative sample (see FIG. 8) in the support set. f is a network parameter (Embedding Kernel) of the learning network θ.

Specifically, the learning unit 13 updates the network parameter of the learning network θ such that a relative distance between feature vectors of the teaching data of the query set and of a positive sample of the support set is small and a relative distance between feature vectors of the teaching data of the query set and of a negative sample of the support set is large. The positive sample is teaching data of the support set and is teaching data which coincides with or is similar to the teaching data of the query set. The negative sample is teaching data of the support set and is teaching data that does not coincide with or is not similar to the teaching data of the query set.

The learning unit 13 repeatedly performs the learning process for each piece of teaching data extracted from the support set and designated in the query set.

[Overall Operations]

Figure 9:
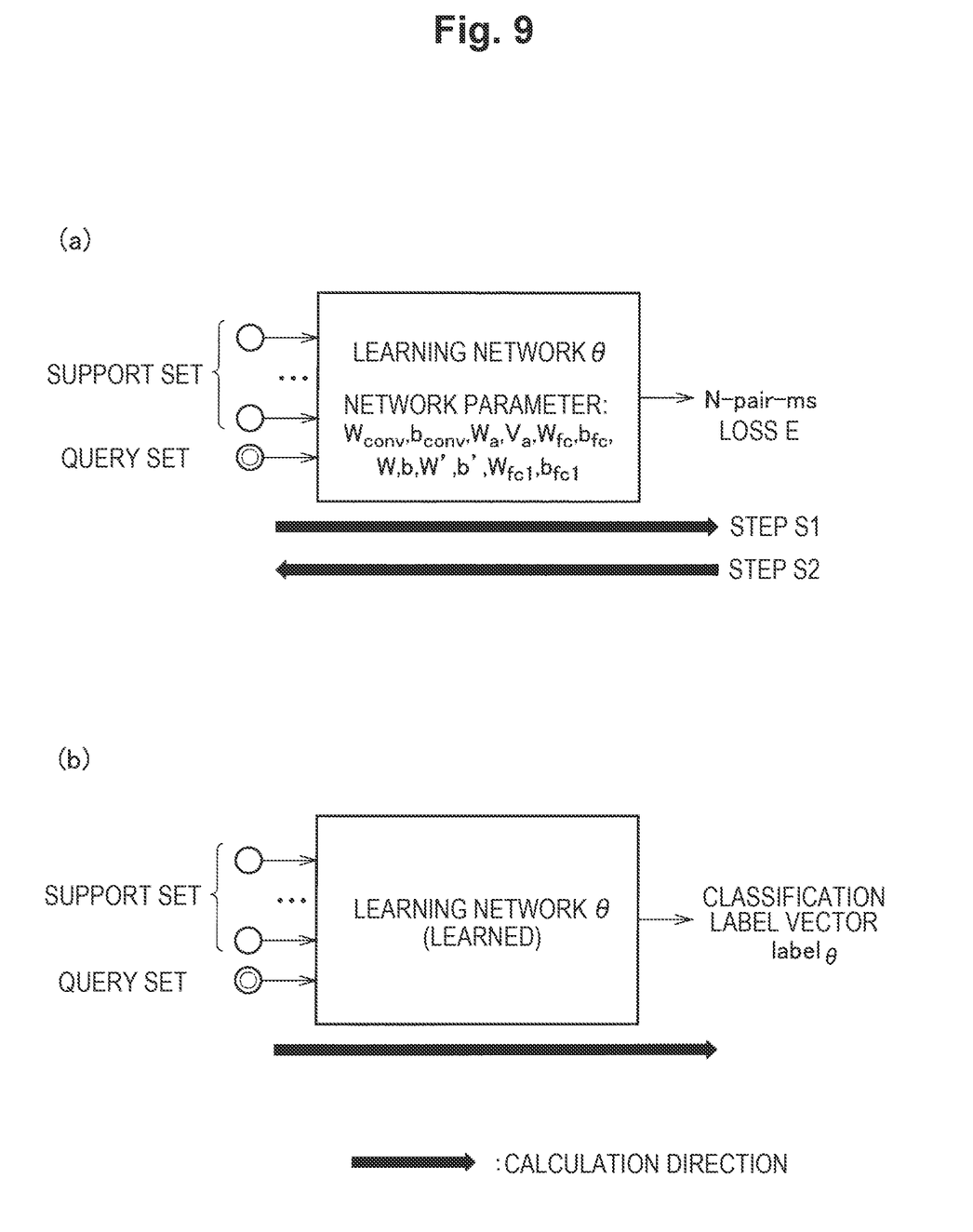
FIG. 9 is a diagram illustrating an operation image of the information processing apparatus.

FIG. 9 is a diagram illustrating an operation image of the information processing apparatus. FIG. 9(a) is an operation image during learning, and FIG. 9(b) is an operation image during inference of a classification category.

[Operations During Learning]

The learning unit 13 calculates a loss E of the learning network θ by Forward Propagation, for example, using the loss function model-defined as in Expression (6) (Step S1).

[Math. 6]

$$E = L_{Npairms}(em_1, em_2, \ldots, em_n);$$

however, $em_i = f(input_i, \theta = FC_{W_{fc}b_{fc}}(DepthConcatNW_{W, b, W, b}(v)));$ $v = CBA_{W_a, V_b, W_k, d_k}(s);$ $$s = Convolution_{W_{conv}, b_{conv}}(input) \quad (6)$$

The learning network θ is a deep neural network and includes a weight variable and a bias variable as each neuron. The weight variable and the bias variable are network parameters of the learning network θ.

$W_{conv}$ is a weight variable of each of the convolution layers L11 to L14 on the side of the support set. $B_{conv}$ is a bias variable of each of the convolution layers L11 to L14 on the side of the support set. $W_a$ is $W_a$ in Expression (1). $V_a$ is $v_a^T$ in Expression (1). $W_{fc}$ is a weight variable of the fully connect layer (see FIG. 7) in the application unit (CBA) 112. $b_{fc}$ is a bias variable of the fully connect layer (see FIG. 7) inside the score application unit (CBA) 112. Note that the fully connect layer in the score application unit (CBA) 112 is a layer that reduces the number of dimensions of the feature vector with respect to the feature vector output from the first convolution layer 111.

W is a weight variable of the first combining layer 113 on the side of the support set. b is a bias variable of the first combining layer 113 on the side of the support set. W' is a weight variable of the second combining layer 123 on the side of the query set. b' is a bias variable of the second combining layer 123 on the side of the query set. $W_{fc1}$ is a weight variable of the fully connect layer in the first combining layer 113. $B_{fc1}$ is a bias variable of the fully connect layer in the first combining layer 113.

The variable s in Expression (6) is a feature vector of the teaching data extracted by performing a convolution operation on the teaching data (input) designated in the support set. The variable v is a value obtained by weighting the attention score for the variable s. In Expression (6), the loss E is calculated by combining the variables v.

Next, the learning unit 13 updates $W_{conv}$, $b_{conv}$, $W_a$, $V_a$, $W_{fc}$, $b_{fc}$, W, b, W', b', $W_{fc1}$, and $b_{fc1}$, which are network parameters of the learning network θ through back propagation using an updated function of the network parameters model-defined as in Expression (7), for example. τ is a learning rate (Step S2).

[Math. 7]

$$\theta \leftarrow \theta - \tau \frac{\partial E}{\partial \theta} \quad (7)$$

Note that Expression (6) is an example of a loss function. The learning unit 13 may use another loss function.

[Operations During Inference of Classification Category]

The classification unit 14 calculates one hot label vector in the learned learning network θ by using a calculation function of a classification label vector model-defined using a Softmax function as in Expression (8), for example.

[Math. 8]

$$label_g = Softmax(FC_{W_{kl},b_{kl}}(DepthConcatNW_{w,b,w',b'});$$

however, $\upsilon = CBA_{W_a,V_a,W_k,b_k}(s)$;

$$s = Convolution_{W_{conv},b_{conv}}(input) \quad (8)$$

Note that Expression (8) is an example of the calculation function of the classification label vector. The classification unit 14 may use another calculation function.

Effects of Embodiment

According to the present embodiment, the learning network θ can accurately classify time-series data with a small amount of teaching data because it includes: a first extraction unit 11 that extracts each feature vector of a plurality of different pieces of teaching data designated in a support set using a first inception neural network that extracts a feature vector of time-series data using a plurality of convolution layers, each of which performs a convolution operation with different filter sizes, a second extraction unit 12 that extracts a feature vector of teaching data designated in a query set using a second inception neural network that extracts a feature vector of time-series data using a plurality of convolution layers, each of which performs a convolution operation with different filter sizes, and a learning unit 13 that updates a network parameter of the learning network such that a relative distance between feature vectors of teaching data of the query set and of a positive sample which coincides with or is similar to teaching data of the query set which is teaching data of the support set is small and a relative distance between feature vectors of the teaching data of the query set and of a negative sample that does not coincide with or is not similar to the teaching data of the query set which is the teaching data of the support set is large, using each of feature vectors of the plurality of pieces of teaching data and the feature vector of the teaching data.

In other words, an analyst can complete setting of the learning processing merely by creating the support set of the learning data that is a small number of correct answers, using taking advantage of his/her knowledge in each field. Knowledge regarding special regression models and parameter setting of each model is not required. Since the configuration of the neural network is shared, the manner of inputting and outputting the time-series data is also uniquely determined, the classification work is also simplified, and even an analyst who is not familiar with various classification technologies can also easily perform classification analysis.

According to the present embodiment, it is possible to efficiently classify time-series data because the second extraction unit 12 extracts a plurality of feature vectors for one piece of teaching data designated in the query set by using the plurality of convolution layers in parallel, and the first extraction unit 11 extracts a plurality of feature vectors for one piece of teaching data designated in the support set by using the plurality of convolution layers in parallel, calculates each attention score based on similarity between the plurality of feature vectors extracted by the first extraction unit and the plurality of feature vectors extracted by the second extraction unit, and applies each of the attention scores to each of the plurality of feature vectors extracted by the first extraction unit.

[Others]

The present invention is not limited to the aforementioned embodiment. The present invention can be modified in various manners within the gist of the present invention.

Figure 10:
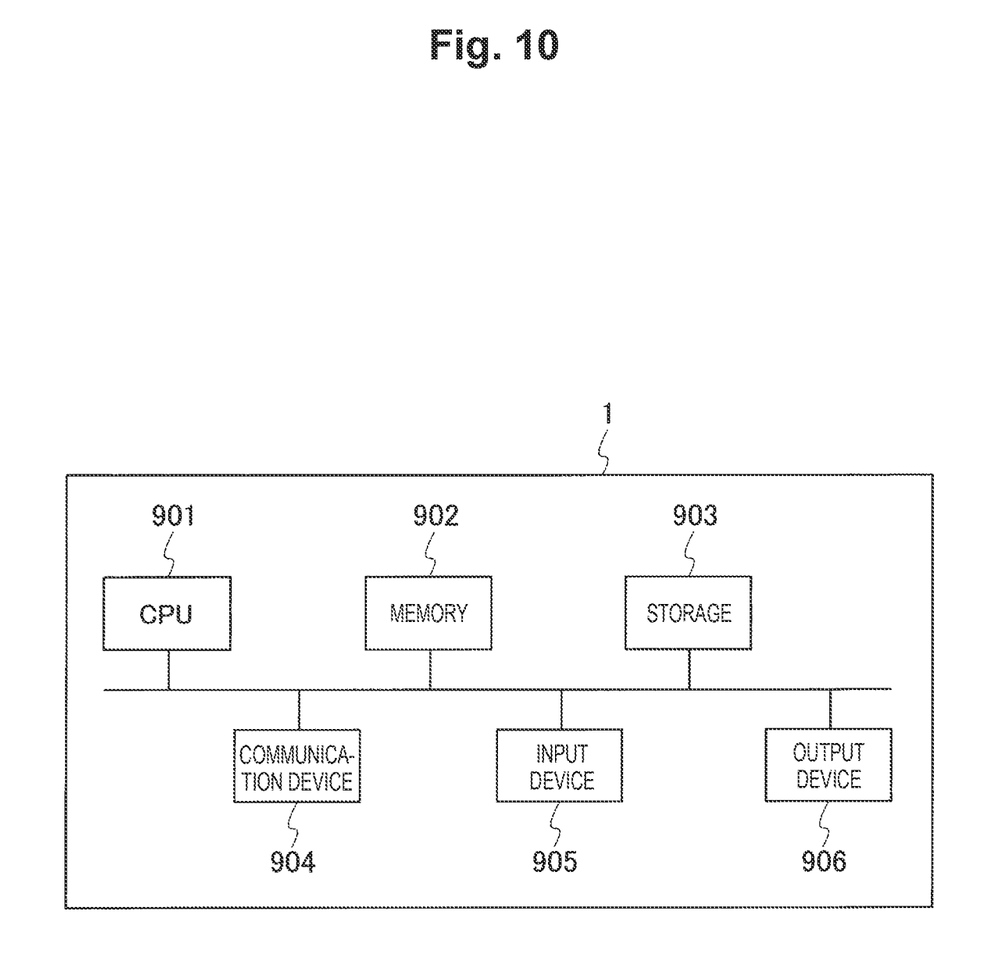
FIG. 10 is a diagram illustrating a hardware configuration of the information processing apparatus.

The information processing apparatus 1 according to the present embodiment described above can be realized using a general-purpose computer system including a central processing unit (CPU; processor) 901, a memory 902, a storage (a hard disk drive (HDD), a solid state drive (SSD)) 903, a communication device 904, an input device 905, and an output device 906 as illustrated in FIG. 10, for example. The memory 902 and the storage 903 are storage devices. In the computer system, each function of the information processing apparatus 1 is realized by the CPU 901 executing a predetermined program loaded on the memory 902.

The information processing apparatus 1 may be implemented by one computer. The information processing apparatus 1 may be implemented by a plurality of computers. The information processing apparatus 1 may be a virtual machine that is implemented in a computer. The program for the information processing apparatus 1 can be stored in a computer-readable recording medium such as an HDD, an SSD, a universal serial bus (USB) memory, a compact disc (CD), or a digital versatile disc (DVD). The program for the information processing apparatus 1 can also be distributed via a communication network.

REFERENCE SIGNS LIST

1 Information processing apparatus
11 First extraction unit
12 Second extraction unit 13 Learning unit
14 Classification unit
15 Storage unit
111 First convolution layer
112 Score application unit
113 First combining layer
121 Second convolution layer
123 Second combining layer
901 CPU
902 Memory
903 Storage
904 Communication device
905 Input device
906 Output device

The invention claimed is:

1. An information processing apparatus that learns or classifies time-series data in a learning network,
wherein the learning network includes:
a first extraction unit, including one or more processors, configured to extract each feature vector of a plurality of different pieces of teaching data designated in a support set using a first inception neural network that extracts a feature vector of time-series data using a plurality of convolution layers, each of which performs a convolution operation with different filter sizes,
a second extraction unit, including one or more processors, configured to extract a feature vector of teaching data designated in a query set using a second inception neural network that extracts a feature vector of time-series data using a plurality of convolution layers, each of which performs a convolution operation with different filter sizes, and
a learning unit, including one or more processors, configured to update a network parameter of the learning network such that a relative distance between feature vectors of teaching data of the query set and of a positive sample which coincides with or is similar to teaching data of the query set which is teaching data of the support set is small and a relative distance between feature vectors of the teaching data of the query set and of a negative sample that does not coincide with or is not similar to the teaching data of the query set which is the teaching data of the support set is large, using each of feature vectors of the plurality of pieces of teaching data and the feature vector of the teaching data.

2. The information processing apparatus according to claim 1, further comprising
a classification unit, including one or more processors, configured to perform estimation calculation for a classification category of time-series data as a classification target designated in the query set for the plurality of pieces of teaching data designated in the support set, using the learning network with the updated network parameter.

3. The information processing apparatus according to claim 1, wherein
the second extraction unit extracts a plurality of feature vectors for one piece of teaching data designated in the query set by using the plurality of convolution layers in parallel, and
the first extraction unit extracts a plurality of feature vectors for one piece of teaching data designated in the support set by using the plurality of convolution layers in parallel, calculates each attention score based on similarity between the plurality of feature vectors extracted by the first extraction unit and the plurality of feature vectors extracted by the second extraction unit, and applies each of the attention scores to each of the plurality of feature vectors extracted by the first extraction unit.

4. An information processing method that learns or classifies time-series data in a learning network, the learning network including:
extracting each feature vector of a plurality of different pieces of teaching data designated in a support set using a first inception neural network that extracts a feature vector of time-series data using a plurality of convolution layers, each of which performs a convolution operation with different filter sizes;
extracting a feature vector of teaching data designated in a query set using a second inception neural network that extracts a feature vector of time-series data using a plurality of convolution layers, each of which performs a convolution operation with different filter sizes; and
updating a network parameter of the learning network such that a relative distance between feature vectors of teaching data of the query set and of a positive sample which coincides with or is similar to teaching data of the query set which is teaching data of the support set is small and a relative distance between feature vectors of the teaching data of the query set and of a negative sample that does not coincide with or is not similar to the teaching data of the query set which is the teaching data of the support set is large, using each of feature vectors of the plurality of pieces of teaching data and the feature vector of the teaching data.

5. The information processing method according to claim 4, further comprising
performing estimation calculation for a classification category of time-series data as a classification target designated in the query set for the plurality of pieces of teaching data designated in the support set, using the learning network with the updated network parameter.

6. A non-transitory computer-readable storage medium storing an information processing program, wherein executing of the information processing program causes one or more computers to perform operations comprising:
extracting each feature vector of a plurality of different pieces of teaching data designated in a support set using a first inception neural network that extracts a feature vector of time-series data using a plurality of convolution layers, each of which performs a convolution operation with different filter sizes;
extracting a feature vector of teaching data designated in a query set using a second inception neural network that extracts a feature vector of time-series data using a plurality of convolution layers, each of which performs a convolution operation with different filter sizes; and
updating a network parameter of the learning network such that a relative distance between feature vectors of teaching data of the query set and of a positive sample which coincides with or is similar to teaching data of the query set which is teaching data of the support set is small and a relative distance between feature vectors of the teaching data of the query set and of a negative sample that does not coincide with or is not similar to the teaching data of the query set which is the teaching data of the support set is large, using each of feature vectors of the plurality of pieces of teaching data and the feature vector of the teaching data.

\* \* \* \* \*